United States Patent [19]

Higuchi et al.

[11] Patent Number: 5,786,070
[45] Date of Patent: Jul. 28, 1998

[54] CROSS-LINKED POLYURETHANE RESIN SHEET AND LAMINATED PRODUCT EMPLOYING IT

[75] Inventors: Toshihiko Higuchi; Satoshi Kondo, both of Yokohama; Hiroyuki Watanabe, Chita-gun, all of Japan; Jean-Louis Bravet, Thourotte; Noel Crux, Compiegne, both of France

[73] Assignees: Asahi Glass Company Ltd., Tokyo, Japan; Saint Gobain Vitrage, Courbevoie, France

[21] Appl. No.: 777,671

[22] Filed: Dec. 20, 1996

[30] Foreign Application Priority Data

Dec. 28, 1995 [JP] Japan ................ 7-342138

[51] Int. Cl.⁶ ............... B32B 17/10; B32B 27/40; C08G 18/42
[52] U.S. Cl. ............ 428/220; 428/338; 428/423.1; 428/423.3; 428/425.5; 428/425.6; 428/428; 428/429
[58] Field of Search ............ 428/423.1, 423.3, 428/425.5, 425.6, 426, 428, 429, 219, 220, 338

[56] References Cited

U.S. PATENT DOCUMENTS

| 4,103,070 | 7/1978 | Ammons | 428/412 |
|---|---|---|---|
| 4,683,171 | 7/1987 | Kuga et al. | 428/354 |
| 4,725,662 | 2/1988 | Kuga et al. | 528/80 |
| 4,997,901 | 3/1991 | Yamada et al. | 528/67 |
| 5,100,731 | 3/1992 | Yamada et al. | 428/423.1 |

FOREIGN PATENT DOCUMENTS

| 0 153 496 | 9/1985 | European Pat. Off. |
| 42 03 307 | 12/1992 | Germany. |
| 61-177241 | 8/1986 | Japan. |
| 61-281118 | 12/1986 | Japan. |

OTHER PUBLICATIONS

Database WPI, Derwent Publications, AN 87-025135, JP 02 051 922, Nov. 9, 1990.

*Primary Examiner*—D. S. Nakarani
*Attorney, Agent, or Firm*—Oblon, Spivak, McClelland, Maier & Neustadt, P.C.

[57] ABSTRACT

A transparent, smooth and cross-linked polyurethane resin sheet prepared from a reaction-curable composition which comprises a high molecular weight polyol mixture (A) comprising a polyester polyol and/or a polycarbonate polyol, as its main components, and containing a diol and a trivalent or higher valent polyol, the average hydroxyl value of the mixture being from 40 to 120, and the equivalent ratio of (the trivalent or higher valent polyol)/(the diol) being from 0.1 to 0.8, a substantially bivalent chain extender (B) in an amount of from 1.9 to 6.0 equivalents per equivalent of the polyol mixture (A), and a substantially bivalent alicyclic or aliphatic polyisocyanate compound (C) in an amount of from 0.8 to 1.2 equivalents per equivalent of the sum of the polyol mixture (A) and the chain extender (B), as its main components.

14 Claims, No Drawings

CROSS-LINKED POLYURETHANE RESIN SHEET AND LAMINATED PRODUCT EMPLOYING IT

The present invention relates to a cross-linked polyurethane resin sheet having a self-healing property and high mechanical properties. Particularly, it relates to a cross-linked polyurethane resin sheet which is capable of providing excellent penetration resistance within a wide temperature range even in a relatively thin thickness when used for laminated safety glass.

Laminated safety glass having a layer of a flexible synthetic resin such as a polyurethane resin provided on one side of an inorganic glass (hereinafter referred to simply as glass) sheet or a laminated glass sheet, is known. The laminated glass sheet is a laminate having two glass sheets laminated with an interlayer of e.g. a polyvinylbutyral resin interposed therebetween. Laminated safety glass having a layer of a cross-linked polyurethane resin (which may be called also as a heat-curable polyurethane resin or a reticulated polyurethane resin) formed on one side of a laminated glass sheet, is disclosed, for example, in JP-B-59-48775.

The role of the cross-linked polyurethane resin in the laminated safety glass disclosed in such a publication is to prevent damages to the skin by fractured glass fragments when a human body collides with the laminated safety glass (i.e. anti-laceration property). Further, a usual synthetic resin is likely to receive scratch marks by e.g. scratching. Whereas, this cross-linked polyurethane resin has a self-healing property (also called a self-recoverying property). The self-healing property is a property whereby when a scratch mark is formed on the surface of the cross-linked polyurethane resin, the mark naturally disappears as the time passes. A cross-linked polyurethane resin having such a property, is known (JP-B-55-6657).

However, such a cross-linked polyurethane resin as disclosed in such a publication is inadequate in the mechanical properties. Laminated safety glass requires mechanical properties such as penetration resistance and an energy-absorbing property at the time of collision of a human body. Laminated safety glass comprising a laminated glass layer and a layer of this cross-linked polyurethane resin, is useful as the laminated glass has such mechanical properties as required for the laminated safety glass. However, it is not possible to substitute this laminated glass sheet by a single glass sheet to obtain laminated safety glass.

With a view to reducing the weight of an automobile, laminated safety glass employing a single glass sheet is more advantageous than laminated safety glass employing the above laminated glass sheet, as a window material for an automobile. Also for other applications, such laminated safety glass is economically superior. In the case of laminated safety glass employing a single glass sheet, the laminated safety glass requires a layer of a flexible synthetic resin having high mechanical properties in order to satisfy the mechanical properties required for laminated safety glass.

As such a synthetic resin material, a polyvinylbutyral resin or a thermoplastic polyurethane resin is, for example, suitable. However, such a material is susceptible to scratching of its surface, and its property such as solvent resistance (hereinafter referred to as the surface property) is inadequate. Accordingly, some surface protection is required. For such surface protection, it is known to use a cross-linked polyurethane resin having the above-mentioned surface property (e.g. JP-B-57-27050, JP-A-53-27671 and JP-A-57-17657).

In such prior art, in laminated safety glass employing a single glass sheet, a relatively thick (at least 0.5 mm) layer of a thermoplastic polyurethane resin functions as a layer for imparting mechanical properties, and a layer of the above-mentioned cross-linked polyurethane resin having a thickness at least 0.4 mm, functions as a protecting layer for the thermoplastic polyurethane resin layer (JP-A-53-27671). It is disclosed that in laminated safety glass having a similar construction employing a laminated glass sheet, the layer of a thermoplastic polyurethane resin functions as an adhesive layer and accordingly may be a thin layer.

The fact that a thick layer is required for imparting mechanical properties in laminated safety glass employing a single glass sheet, brings about various difficulties. Firstly, the sheet constituting this layer must be a sheet excellent in optical properties, which has a smooth surface and a uniform thickness. For example, by a method wherein a polyvinylbutyral resin or a thermoplastic polyurethane resin is sheeted by extrusion molding, fine irregularities are likely to form on the surface, or a change in the thickness of the sheet is likely to result, whereby it is difficult to obtain a sheet which fully satisfies the optical properties.

The cross-linked polyurethane resin can readily be formed into a sheet having excellent optical properties by casting. However, a thermoplastic polyurethane resin can not easily be sheeted by casting, since the viscosity of the starting material mixture is high. Sheeting by casting is a method wherein a starting material mixture is cast and solidified on a smooth surface for sheeting.

A method may be conceivable wherein the starting material mixture of a thermoplastic polyurethane resin is diluted with a solvent to lower the viscosity, followed by casting. However, by such a method, it is difficult to obtain a relatively thick sheet, although a thin sheet may be obtained.

In view of these problems, the present inventors considered it very advantageous economically and from the viewpoint of production technique to have the flexible synthetic resin layer of laminated safety glass constituted substantially by a single layer of synthetic resin material, and have conducted a research for a cross-linked polyurethane resin which has the above surface property and mechanical properties and which is suitable for casting. As a result, a cross-linked polyurethane resin having such properties suitable for production of laminated safety glass, has been previously proposed (JP-A-61-177241 and JP-A-61-281118). However, such a cross-linked polyurethane resin is inadequate in penetration resistance especially when formed into a thin film, and further, impact resistance at a low temperature is inadequate.

It is an object of the present invention to provide a cross-linked polyurethane resin sheet having such properties improved.

The present invention provides a transparent, smooth and cross-linked polyurethane resin sheet prepared from a reaction-curable composition which comprises a high molecular weight polyol mixture (A) comprising a polyester polyol and/or a polycarbonate polyol, as its main components, and containing a diol and a trivalent or higher valent polyol, the average hydroxyl value of the mixture being from 40 to 120, and the equivalent ratio of (the trivalent or higher valent polyol)/(the diol) being from 0.1 to 0.8, a substantially bivalent chain extender (B) in an amount of from 1.9 to 6.0 equivalents per equivalent of the polyol mixture (A), and a substantially bivalent alicyclic or aliphatic polyisocyanate compound (C) in an amount of from 0.8 to 1.2 equivalents per equivalent of the sum of the polyol mixture (A) and the chain extender (B), as its main components.

The reaction-curable composition may further contain a silane compound (D) in an amount of from 0.001 to 10 wt %, based on the total weight of components (A), (B) and (C).

The cross-linked polyurethane resin sheet is particularly preferably used for a laminated product having a layered structure comprising at least two layers including a layer of the cross-linked polyurethane resin sheet on one side and a layer of inorganic glass on the other side. Further, it is particularly preferably used for a laminated product having a layered structure comprising at least three layers including a first surface layer made of a synthetic resin, an interlayer made of the above-mentioned cross-linked polyurethane resin sheet and a second surface layer made of inorganic glass.

Now, the present invention will be described in further detail with reference to the preferred embodiments.

A polyurethane resin is obtained by a reaction of a polyvalent active hydrogen-containing compound, particularly a polyol, with a polyvalent isocyanate group-containing compound (hereinafter referred to as a polyisocyanate compound). When both of these two types of compounds are bivalent, a thermoplastic polyurethane resin is obtainable. When either one of these two types of compounds exceeds bivalent, a cross-linked polyurethane resin is obtainable. The physical properties of the cross-linked polyurethane resin are influenced mainly by the type of the active hydrogen-containing compound.

In general, a polyurethane resin elastomer having high mechanical properties, can be obtained by a combined use of an active hydrogen-containing compound having a high molecular weight and an active hydrogen-containing compound having a low molecular weight so-called a chain extender or a crosslinking agent. However, as a result of a study by the present inventors, it has been found extremely difficult to obtain the high mechanical properties of the cross-linked polyurethane resin within a wide temperature range. Namely, a cross-linked polyurethane resin having high mechanical properties at room temperature is usually poor in impact resistance at a low temperature as the flexibility is remarkably impaired at a low temperature. Thus, cross-linked polyurethane resins having excellent mechanical properties within a wide temperature range are relatively limited types of polyurethane resins.

In the present invention, the cross-linked polyurethane resin is required to be a polyurethane resin prepared from a reaction-curable composition which comprises the following starting materials:

1. A relatively high molecular weight polyol mixture (A) and a low molecular weight active-hydrogen-containing compound (hereinafter referred to as a chain extender (B)) are used in combination. If the chain extender (B) is not incorporated, it tends to be difficult to obtain a cross-linked polyurethane resin having high mechanical properties.

2. The polyol mixture (A) is required to be a mixture of a diol and a trivalent or higher valent polyol, whereby the average hydroxyl value is from 40 to 120, and the equivalent ratio of (the trivalent or higher valent polyol)/(the diol) is within a range of from 0.1 to 0.8.

Here, 1 mol of a compound wherein the number of active hydrogen atoms or isocyanate groups per molecule is n, corresponds to n equivalents.

If the average hydroxyl value is higher than 120, the impact resistance at a low temperature tends to be low, and if it is lower than 40, the self-healing property tends to be hardly obtainable. If the equivalent ratio is higher than 0.8, the mechanical properties tend to be low, and if it is lower than 0.1, the self-healing property tends to be hardly obtainable.

The hydroxyl value is used as a numerical value relating to the molecular weight of polyols, because when a diol and a trivalent or higher valent polyol are used in combination, the influence of their molecular weights over the physical properties can not simply be represented by the average value of their molecular weights.

The above polyol mixture (A) preferably comprises a combination of a diol having the average hydroxyl value of from 35 to 75 and a trivalent or higher valent polyol having the average hydroxyl value of from 50 to 300. If the average hydroxyl value of the diol is higher than this range, the penetration resistance at a low temperature tends to be low. It is particularly preferred that the diol has the average hydroxyl value of from 45 to 65. Further, it is particularly preferred that the trivalent or higher valent polyol has the average hydroxyl value of from 150 to 250.

Each of the diol and the trivalent or higher valent polyol may be a combination of two or more respective members. In such a case, the individual polyols may have hydroxyl values outside the above range, so long as the average hydroxyl value is within the above range. However, the upper limit of the hydroxyl value of each polyol is 400, so that it can be distinguished from the chain extender which will be described hereinafter.

The average hydroxyl value in the combination of such diols and trivalent or higher valent polyols is most preferably from 60 to 90, and the equivalent ratio of such (trivalent or higher valent polyols)/(diols) is most preferably from 0.20 to 0.50.

3. The chain extender (B) is a substantially bivalent compound. The polyisocyanate compound (C) is also a substantially bivalent polyisocyanate compound. Here, "substantially bivalent" means that the number of functional groups does not exceed about 2.1. If the number of functional groups exceeds this level, the mechanical properties tend to be low.

4. The amount of the chain extender per equivalent of the polyol mixture (A) is from 1.9 to 6.0 equivalents. If the amount is larger than this range, a proper self-healing property tends to be hardly obtainable, and the impact resistance at a low temperature tends to deteriorate. If the amount is lower than this range, the penetration resistance at room temperature tends to be inadequate when formed into a thin film. The amount of the chain extender (B) per equivalent of the above polyol mixture (A) is most preferably from 2.2 to 4.5 equivalents.

5. The amount of the polyisocyanate compound (C) per equivalent of the sum of the polyol mixture (A) and the chain extender (B) is substantially equivalent, particularly from 0.8 to 1.2 equivalents.

As the diol and the trivalent or higher valent polyol in the above polyol mixture (A), a polyester polyol and/or a polycarbonate polyol are selected as its main polyols (i.e. more than half of all polyols). A polyoxypropylene polyol may not be used in a large amount in view of the mechanical properties of the cross-linked polyurethane resin. Particularly preferably, the polyol consists essentially of a polyester polyol and/or a polycarbonate polyol.

However, if a polyester polyol is used alone, some difficulty is likely to result in water resistance of the cross-linked polyurethane resin. On the other hand, a polycarbonate polyol has a high viscosity, and its single use is likely to have a problem when it is to be sheeted by casting. Accordingly, it is most preferred to use both in combination.

Presently, types of commercial products of polycarbonate polyols are rather limited, and there is the above-mentioned problem. However, if a polycarbonate polyol having a proper low viscosity becomes available, such a polycarbonate polyol may be used alone. At present, the proportion of the polycarbonate polyol based on all polyols, is preferably at least 15 wt %, particularly preferably at least 25 wt %. A trivalent or higher valent polycarbonate polyol may be used, if available.

At present, in view of the problem with respect to the viscosity and the availability of the polycarbonate polyol, the polyol is preferably a combination of three components i.e a trifunctional or higher functional polyester polyol, a polycarbonate diol and a polyester diol, whereby the best cross-linked polyurethane resin may be obtained. However, the useful polyol is not limited to such a combination, if such restrictions will be removed. At present, the average hydroxyl value of the polycarbonate diol is from 35 to 75, and its proportion based on all diols, is preferably from 25 to 75 wt %, particularly preferably from 25 to 60 wt %.

As the polycarbonate polyol, a polycarbonate diol obtainable by using ethylene glycol, diethylene glycol, dipropylene glycol, 1,4-butane diol, neopentyl glycol, 1,6-hexane diol, cyclohexane dimethanol or other aliphatic or alicyclic bivalent alcohol, or a more than bivalent polycarbonate polyol obtainable by further using a small amount of trivalent or higher valent alcohol in combination, may be used.

Further, a ring-opened polymer of a cyclic carbonate compound may also be used. It is known to use a polyurethane resin prepared by using a polycarbonate polyol, for laminated safety glass (e.g. JP-B-55-19249, JP-A-49-98818, JP-A-51-144492 and JP-A-59-22197).

In the present invention, polycarbonate polyols as disclosed in these prior art references, may be employed. The most preferred polycarbonate polyols are poly(1,6-hexane carbonate)diol and poly(1,6-hexane/1,4-dimethylene cyclohexane carbonate)diol.

As the polyester polyol, a polyester polyol having polyhydric alcohol residues and polybasic carboxylic acid residues, or a polyester polyol having hydroxycarboxylic acid residues, is useful.

Preferred as the former is a polyester polyol having dihydric alcohol residues or the dihydric alcohol residues plus a small amount of trihydric or higher polyhydric alcohol residues, and dibasic acid residues. For example, a polyester polyol having residues of ethylene glycol, diethylene glycol, propylene glycol, 3-methyl-1,5-pentane diol, dipropylene glycol, 1,4-butane diol, neopentyl glycol, 1,6-hexane diol, glycerol, trimethylol propane or hexane triol, and residues of adipic acid, azelaic acid, sebacic acid or phthalic acid, is useful.

Preferred as the latter is a polyester polyol obtained by adding a cyclic ester such as ε-caprolactone (hereinafter referred to as caprolactone) or a hydroxycapronic acid, to the above-mentioned polyhydric alcohol, or water or other polyvalent compound.

Further, polyester polyols disclosed in the above-mentioned prior art references, particularly in JP-A-53-27671 and JP-A-57-176157, may be used. Furthermore, as generally described materials, polyester polyols of the type disclosed in e.g. "Plastic Material Lecture (2) Polyurethane Resins" published by Nikkan Kogyo Shinbun, p. 56–61 and p. 133–168, may be mentioned.

Preferred as the polyester polyol is a poly(1,4-butylene adipate)polyol, a poly(ethylene adipate)polyol, a poly(1,4-butylene azelate)polyol, a poly(caprolactone)polyol, or a poly(3-methylpentylene adipate)polyol. As the trivalent or higher polyol, a triol is preferred, and a poly(caprolactone) triol is particularly preferred.

A poly(oxytetramethylene)polyol is usually inferior to the above described two types of polyols in the mechanical properties or weather resistance. However, it is superior to a polyester polyol in water resistance, and it is useful as a substitute for a part of the polyester polyol. However, usually it is better not to use it.

Other polyols (such as polyoxypropylene polyols or polybutadiene polyols) than the above described are not usually used. Even if they are used for some purposes, they should not be used as main polyols. However, a polyol excellent in mechanical properties, weather resistance, water resistance or viscosity may be incorporated, as the case requires.

The chain extender (B) is preferably composed of at least one diol or diamine having a molecular weight of not higher than 280. Particularly preferred is a diol having a molecular weight of at most 160. A trivalent or higher valent low molecular weight active hydrogen-containing compound such as a low molecular weight triol may be incorporated in a very small amount. However, the chain extender is usually composed solely of a bivalent compound.

As the chain extender (B), specifically, ethylene glycol, diethylene glycol, 1,3-propane diol, 1,4-butane diol, neopentyl glycol, 1,5-pentane diol, 1,6-hexane diol or cyclohexane dimethanol, may, for example, be used. In place of or in addition to such a diol, a dihydroxy carboxylic acid or a diamine, such as dimethylol acetic acid, dimethylol propionic acid, diaminodicyclohexylmethane or isophorone diamine, may be used.

A preferred chain extender is a $C_{2-8}$ aliphatic diol or alicyclic diol, and particularly preferred is 1,4-butane diol, cyclohexane dimethanol or a mixture thereof. It is particularly preferred that a part or whole is cyclohexane dimethanol. The cyclohexane dimethanol is preferably 1,4-form, but it may be 1,3-form, 1,2-form or 1,1-form, or a mixture of two or more of these four types.

As the polyisocyanate compound (C), a substantially bivalent alicyclic or aliphatic polyisocyanate, is used. Specifically, it may, for example, be 4,4'-methylene bis (cyclohexylisocyanate), isophorone diisocyanate, cyclohexane diisocyanate, tetramethylene diisocyanate, hexamethylene diisocyanate or a bivalent modified product thereof (such as a prepolymer type modified product or a urea-modified product). A particularly preferred polyisocyanate compound is 4,4'-methylene bis(cyclohexyl isocyanate) or isophorone diisocyanate.

A small amount of a trivalent or higher valent non-yellowing polyisocyanate may be incorporated. However, usually, only a bivalent polyisocyanate compound is used.

In addition to the above described main materials, small amounts of other additional materials are required in many cases. Particularly, a catalyst and a stabilizer are required in many cases. As the catalyst, an organic metal compound type catalyst such as an organic tin compound may suitably be used.

As the stabilizer, it is preferred to use one or more selected from antioxidants, ultraviolet absorbers and photo-stabilizers. For example, a hindered phenol compound, a hindered amine compound, a phosphoric acid ester compound, a benzophenone compound or a benzotriazole compound may be used.

Further, depending upon the particular purpose, a small amount of e.g. a colorant, a flame retardant, a release agent, an adhesion-improving agent, a surfactant or an electrical conductivity-imparting agent, may be used. In some cases, a small amount of a diluting agent for reagents, may be employed, but usually such a diluting agent is not required.

The cross-linked polyurethane resin is prepared by using the reaction-curable composition comprising the above described materials by a method such as a one-shot process, a prepolymer process or a sub-prepolymer process. Sheeting is carried out by a casting method. It is particularly preferred that the materials are mixed by a one-shot process, and the resulting mixture is cast on a flat surface and solidified for sheeting (i.e. a casting method). Sheeting by a casting method is disclosed in the above-mentioned prior art references and in JP-A-55-105534 and JP-A-56-162618. As a method for forming the sheet of the present invention, such conventional methods may be employed.

The cross-linked polyurethane resin sheet of the present invention is required to be transparent and smooth. By casting the above described reaction-curable composition, it is possible to obtain an extremely smooth sheet. On the other hand, by using the above-described reaction curable composition as the starting material, a sheet having high transparency is usually obtained.

The thickness of the sheet of the present invention is not particularly limited, but it is preferably from 0.1 to 2.0 mm, more preferably from 0.2 to 1.2 mm.

The cross-linked polyurethane resin sheet of the present invention has a feature that it is capable of providing sufficient penetration resistance with a thickness thinner than a conventional cross-linked polyurethane resin sheet. However, if the sheet is too thin, there may be case where mechanical strength such as penetration resistance will be inadequate when it is used for laminated safety glass. On the other hand, the one which is unnecessarily thick, is not economical.

The cross-linked polyurethane resin sheet of the present invention is a transparent and smooth sheet and has a feature that it is a cross-linked polyurethane resin sheet having a self-healing property and penetration resistance. Such a cross-linked polyurethane resin sheet of the present invention is particularly suitable for application to laminated safety glass.

Namely, it is particularly preferred to use the cross-linked polyurethane resin sheet of the present invention for a laminated product having a layered structure comprising at least two layers including a layer of the cross-linked polyurethane resin sheet on one side and a layer of inorganic glass on the other side. Further, it is particularly preferred to use it for a laminated product having a layered structure comprising at least three layers including a first surface layer made of a synthetic resin, an interlayer made of the cross-linked polyurethane resin sheet and a second surface layer made of inorganic glass.

The first surface layer protects the interlayer made of the cross-linked polyurethane resin sheet and presents good surface properties to the laminate of inorganic glass/cross-linked polyurethane resin sheet. A synthetic resin excellent in scratch resistance and stain resistance, is preferred. Particularly preferred is a certain cross-linked polyurethane resin.

The polyurethane resin disclosed in JP-A-64-56717 is further preferred. Namely, particularly preferred is a surface layer made of a polyurethane which is obtained by reacting and curing a polyisocyanate component comprising a diisocyanate and a trifunctional or higher functional polyisocyanate and having an average molecular weight per functional group or per isocyanate group of from 120 to 240, with a polyol component comprising a diol and a trifunctional or higher functional polyol and having an average molecular weight per functional group or per hydroxyl group of from 100 to 550.

In this case, the diisocyanate is preferably an alicyclic diisocyanate or an aliphatic diisocyanate. Specifically, the above-mentioned diisocyanate may be employed. The trifunctional or higher functional polyisocyanate may preferably be a burette-modified product, an isocyanurate-modified product or a trimethylol propane-modified product of such a diisocyanate.

As the polyol component comprising a diol and a trifunctional or higher functional polyol, a polyester polyol, a polycarbonate polyol or a polyoxytetramethylene polyol is preferred. Particularly preferred is a polyester polyol such as polycaprolactone polyol.

The above-mentioned laminated product is preferably prepared by laminating an inorganic glass sheet and the cross-linked polyurethane resin sheet having a surface layer made of a synthetic resin on one side (hereinafter referred to as a preliminary laminated sheet) with an adhesive material interposed therebetween. Such a preliminary laminated sheet can be prepared, for example, by a method disclosed in JP-A-53-27671. For example, it can be prepared by casting the reaction-curable composition of the present invention on a layer made of a certain specific synthetic resin formed on a carrier.

The adhesive material to be used for bonding the preliminary laminated sheet and the inorganic glass sheet, is preferably selected from thermoplastic polyurethane resins, polyvinylbutyral resins and EVA resins. However, the adhesive material is not particularly limited to such specific examples. The EVA resins are resins of a copolymer of ethylene with vinyl acetate, or resins made of partial hydrolyzates thereof.

As a method for interposing the adhesive material, it is preferred to employ a method wherein an adhesive layer made of the adhesive material is formed on the cross-linked polyurethane resin sheet side of the preliminary laminated sheet, and then the inorganic glass sheet is laminated thereon.

As a method for laminating the relatively flexible synthetic resin sheet and the inorganic glass sheet, hot pressing is usually employed. For the hot pressing, an autoclave is usually used. It is preferred that firstly, air between the sheets is withdrawn under reduced pressure, and then pressing is applied to press the two sheets to each other. The two sheets may be pressed only by reduced pressure, or lamination can be carried out only by pressing.

A specific method for lamination is disclosed, for example, in JP-B-58-12140 or JP-B-55-14074. It is preferred that pretreatment is preliminarily applied to the bonding surface of the inorganic glass sheet to improve the adhesion. Specifically, it is preferred to preliminarily coat a treating agent such as a silane compound (E).

Otherwise, by preliminarily incorporating a silane compound (D) to the adhesive resin material and/or the reaction-curable composition, it is possible to obtain a good adhesive property without applying the above pretreatment to the inorganic glass sheet. The method of preliminarily incorporating it to the reaction-curable composition is particularly effective.

Namely, particularly preferred is a cross-linked polyurethane resin prepared by using a reaction-curable composition which comprises the polyol (A), the chain extender (B), the polyisocyanate compound (C) and a silane compound (D) in an amount of from 0.001 to 10 wt %, based on the total weight of components (A), (B) and (C), as its main components.

As the silane compound (D) or the silane compound (E), an alkoxy silane containing an amino group or a glycidyloxy group, may, for example, be useful.

Specific examples include γ-aminopropyltrimethoxysilane, γ-aminopropylmethyldimethoxysilane, γ-glycidyloxypropyltrimethoxysilane and γ-glycidyloxypropylmethyldimethoxysilane.

The thickness of the layer of the inorganic glass sheet in the laminated product is preferably from 1 to 10 mm, particularly preferably from 2 to 6 mm. When used as a window material for an automobile, the thickness of the layer of the inorganic glass sheet is preferably from 3 to 5 mm. The thickness of the cross-linked polyurethane resin sheet is preferably from 0.1 to 2.0 mm, as mentioned above. Particularly preferably, it is from 0.2 to 1.2 mm, when it is used for laminated safety glass to be employed as a window material for an automobile.

The thickness of the adhesive layer made of the adhesive material is preferably less than 0.2 mm, particularly preferably not more than 0.1 mm, more preferably not more than 0.05 mm. The lower limit for the thickness of this layer is not particularly limited, but is usually 0.01 mm.

The laminated product of the present invention is most suitable for a window material of an automobile, particularly for a wind shield glass. However, it is not limited to such a specific application, and it is useful also as a window glass for buildings, for which the safety is required. The laminated product of the present invention is usually a colorless or colored transparent product. It may partially have an opaque portion.

Now, the present invention will be described in further detail with reference to Examples. However, it should be understood that the present invention is by no means restricted to such specific Examples. Further, in the present invention, the physical properties were measured by the following methods.

Methods for measuring physical properties

Self-healing property: The surface of the cross-linked polyurethane resin was scratched with a diamond chip of 10 μm in diameter under load, whereupon the self-healing property was represented by the maximum load where the formed scratch mark disappeared within 10 minutes at 25° C. Disappearance of the scratch mark was visually evaluated. In the case of inorganic glass having no self-healing property, the maximum load by this method was 5 g.

Penetration resistance at room temperature: Measured by the penetration resistance test in accordance with JIS R3212.

Impact resistance at a low temperature: Measured by the impact resistance test at −20° C. in accordance with JIS R3212.

Light transmittance, Taber's abrasion: In accordance with JIS K6301.

PREPARATION EXAMPLE 1

Preparation of a surface layer made of a synthetic resin excellent in scratch resistance and stain resistance 50 parts (parts by weight, the same applies hereinafter) of poly(caprolactone)triol having a hydroxyl value of 196, 40 parts of poly(caprolactone)triol having a hydroxyl value of 540 and 10 parts of poly(caprolactone)diol having a hydroxyl value of 38, were heat-melted at 100° C. and then stirred and mixed while dehydrating and deaerating under reduced pressure.

This polyol mixture was cooled to 80° C., and then $6.0 \times 10^{-3}$ parts of dibutyltin dilaurate (hereafter referred to as the catalyst), 4.7 parts of 4,4'-methylene bis (cyclohexylisocyanate) (hereinafter referred to as $H_{12}MDI$), 4.7 parts of isophorone diisocyanate and 85 parts of an isocyanurate-modified product of 1,6-hexane diisocyanate, were added and mixed thereto with stirring.

Heat generation was observed as the reaction started. When the system became uniform, defoaming was carried out under reduced pressure with stirring at 80° C. for 3 minutes. This prepolymerized liquid was cast on a release-treated glass sheet (500×500 mm) treated with a release agent, and reacted for 15 hours in a nitrogen-purged furnace at 120° C. to obtain a transparent surface layer having a mirror surface and a thickness of 0.1 mm.

Example 1

Preparation of A-1

35 parts of poly(1,6-hexane carbonate)diol having a hydroxyl value of 55, 55 parts of poly(caprolactone)diol having a hydroxyl value of 55 and 10 parts of poly(caprolactone)triol having a hydroxyl value of 196, were heat-melted at 100° C. and then stirred and mixed while dehydrating and deaerating under reduced pressure. This polyol mixture was cooled to 80° C., and then $6.0 \times 10^{-3}$ parts of the catalyst, 13.1 parts of 1,4-butane diol, 13.1 parts of 1,4-cyclohexane dimethanol and 80 parts of $H_{12}MDI$, were sequentially added and mixed thereto under stirring.

Heat generation was observed as the reaction started. When the system became uniform, defoaming was carried out under reduced pressure while stirring at 80° C. for 3 minutes. This prepolymerized liquid was cast on the surface layer obtained in Preparation Example 1 and reacted for 15 hours in a nitrogen-purged furnace of 120° C. to obtain a preliminary laminate having a total thickness of 0.8 mm. In this Example, the average hydroxyl value of polyols was 69, and the amount of the chain extender per equivalent of polyols, was 3.8 equivalents.

A thermoplastic polyurethane resin was hot press-bonded to the above preliminary laminate to form an adhesive layer. Then a glass sheet (3.5×500×500 mm) having its surface preliminarily treated with γ-glycidyl oxypropyltrimethoxysilane, was prepared, and the preliminary laminate was overlaid on the glass sheet so that the adhesive layer surface faced the surface treated side of the glass sheet. This assembly was put in a rubber bag, and the bag was evacuated to 1 mmHg and maintained under such a reduced pressure for 10 minutes in an oven of 120° C. Then, the laminated product was taken out from the rubber bag, and hot press-bonded for 30 minutes in an autoclave under a pressure of 8 kg/cm² at 130° C. and then left to cool. The obtained laminated safety glass will be referred to hereinafter as A-1. In the following Examples 2 and 3 and Comparative Examples 1 and 2, laminated safety glasses were prepared in the same manner as above except that the starting materials were changed. The names (A-2, A-3, X-1 and X-2) of the respective laminated products and their starting materials, the average hydroxyl vales of polyols and the equivalent amounts of the chain extender per equivalent of polyols, are shown below.

Example 2

Preparation of A-2

| | |
|---|---|
| Poly(1,6-hexane carbonate)diol having a hydroxyl value of 55: | 35 parts, |
| Poly(3-methylpentylene adipate)diol having a hydroxyl value of 55: | 55 parts, |
| Poly(caprolactone)triol having a hydroxyl value of 196: | 10 parts, |

-continued

| | |
|---|---|
| Catalyst: | $6.0 \times 10^{-3}$ parts, |
| 1,4-butane diol: | 9.4 parts, |
| 1,4-cyclohexane dimethanol: | 9.4 parts, |
| Isophorone diisocyanate: | 53 parts, |
| Average hydroxyl value of polyols: | 69, |
| Equivalent amount of the chain extender: | 2.8. |

Example 3

Preparation of A-3

| | |
|---|---|
| Poly(1,6-hexane carbonate)diol having a hydroxyl value of 55: | 35 parts, |
| Poly(3-methylpentylene adipate)diol having a hydroxyl value of 55: | 55 parts, |
| Poly(caprolactone)triol having a hydroxyl value of 310: | 10 parts, |
| Catalyst: | $6.0 \times 10^{-3}$ parts, |
| 1,4-butane diol: | 9.5 parts, |
| 1,4-cyclohexane dimethanol: | 9.5 parts, |
| Isophorone diisocyanate: | 56 parts, |
| Average hydroxyl value of polyols: | 81, |
| Equivalent amount of the chain extender: | 2.4. |

Example 4

Preparation of A-4

A preliminary laminate was prepared in the same manner as in Example 1, except that 0.2 part of γ-glycidyl oxypropyltrimethoxysilane was added together with the catalyst and 1,4-butane diol.

A thermoplastic polyurethane resin was hot press-bonded to the above preliminary laminate to form an adhesive layer. Then, a thoroughly cleaned glass sheet (3.5×500×500 mm) was prepared, and the preliminary laminate was overlaid on the glass sheet so that the adhesive layer surface faced the glass sheet surface. The assembly was put in a rubber bag, and the rubber bag was evacuated to about 1 mmHg and maintained under the reduced pressure for 10 minutes in an oven of 120° C. Then, the laminated product was taken out from the rubber bag and hot press-bonded for 30 minutes in an autoclave under a pressure of 8 kg/cm² at 130° C. and then left to cool. The obtained laminated safety glass is designated as A-4.

Compartive Example 1

Preparation of X-1

| | |
|---|---|
| Poly(1,6-hexane carbonate)diol having a hydroxyl value of 55: | 17.5 parts, |
| Poly(1,6-hexane carbonate)diol having a hydroxyl value of 128: | 17.5 parts, |
| Poly(caprolactone)diol having a hydroxyl value of 91: | 55 parts, |
| Poly(caprolactone)triol having a hydroxyl value of 196: | 10 parts, |
| Catalyst: | $6.0 \times 10^{-3}$ parts, |
| 1,4-butane diol: | 7.9 parts, |
| $H_{12}MDI$: | 48 parts, |
| Average hydroxyl value of polyols: | 102, |
| Equivalent amount of the chain extender: | 1.0. |

Compartive Example 2

Preparation of X-2

| | |
|---|---|
| Poly(1,6-hexane carbonate)diol having a hydroxyl value of 128: | 35 parts, |
| Poly(caprolactone)diol having a hydroxyl value of 128: | 55 parts, |
| Poly(caprolactone)triol having a hydroxyl value of 196: | 10 parts, |
| Catalyst: | $6.0 \times 10^{-3}$ parts, |
| 1,4-butane diol: | 22.4 parts, |
| $H_{12}MDI$: | 99 parts, |
| Average hydroxyl value of polyols: | 135, |
| Equivalent amount of the chain extender: | 2.1. |

Physical properties of laminated safety glasses

The surface properties and penetration resistance of laminated safety glasses A-1 to X-2 are shown in Table 1.

TABLE 1

| | A-1 | A-2 | A-3 | A-4 | X-1 | X-2 |
|---|---|---|---|---|---|---|
| Self-healing property (g) | 120 | 130 | 125 | 120 | 120 | 100 |
| Light transmittance (%) | 91 | 91 | 91 | 91 | 91 | 91 |
| Taber's abrasion (%) | 1.5 | 1.5 | 1.5 | 1.5 | 1.5 | 1.5 |
| Penetration resistance at room temperature | Good | Good | Good | Good | Poor | Good |
| Impact resistance at low temperature | Good | Good | Good | Good | Good | Poor |

Particularly when used for laminated safety glass, the cross-linked polyurethane resin sheet of the present invention provides excellent penetration resistance within a wide temperature range even in a relatively thin thickness. It is particularly excellent in impact resistance at a low temperature.

What is claimed is:

1. A transparent and cross-linked polyurethane resin sheet having self-healing properties and evincing excellent penetration resistance, prepared from a reaction-curable composition which comprises a polyol mixture (A) comprising a polyester polyol and/or a polycarbonate polyol, as its main components, and containing a diol and a trivalent or higher valent polyol, the average hydroxyl value of the mixture being from 40 to 120, the upper limit of the hydroxyl value of each polyol being 400, and the equivalent ratio of the trivalent or higher valent polyol to the diol being from 0.1 to 0.8, a substantially bivalent chain extender (B) other than (A) having a molecular weight not higher than 280 in an amount of from 1.9 to 6.0 equivalents per equivalent of the polyol mixture (A), and a substantially bivalent alicyclic or aliphatic polyisocyanate compound (C) in an amount of from 0.8 to 1.2 equivalents per equivalent of the sum of the polyol mixture (A) and the chain extender (B), as its main components.

2. The cross-linked polyurethane resin sheet according to claim 1, wherein the reaction-curable composition further contains a silane compound (D) in an amount of from 0.001 to 10 wt %, based on the total weight of components (A), (B) and (C).

3. The cross-linked polyurethane resin sheet according to claim 1, which is prepared by casting the reaction-curable composition.

4. The cross-linked polyurethane resin sheet according to claim 1, wherein the polyol mixture (A) contains at least one diol having the average hydroxyl value of from 35 to 75 and at least one trivalent or higher valent polyol having the average hydroxyl value of from 50 to 300.

5. The cross-linked polyurethane resin sheet according to claim 1, wherein the polyol mixture (A) contains at least 15 wt % of the polycarbonate polyol.

6. The cross-linked polyurethane resin sheet according to claim 1, wherein the amount of the chain extender (B) is from 2.2 to 4.5 equivalents per equivalent of the polyol mixture (A).

7. The cross-linked polyurethane resin sheet according to claim 1, wherein a part or whole of the chain extender (B) is cyclohexane dimethanol.

8. The cross-linked polyurethane resin sheet according to claim 1, which has a thickness of from 0.1 to 2.0 mm.

9. A laminated product having a layered structure comprising at least two layers including a layer of a transparent and cross-linked polyurethane resin sheet having self-healing properties and evincing excellent penetration resistance, prepared from a reaction-curable composition which comprises a high molecular weight polyol mixture (A) comprising a polyester polyol and/or a polycarbonate polyol, as its main components, and containing a diol and a trivalent or higher valent polyol, the average hydroxyl value of the mixture being from 40 to 120, the upper limit of the hydroxyl value of each polyol being 400 and the equivalent ratio of the trivalent or higher valent polyol to the diol being from 0.1 to 0.8, a substantially bivalent chain extender (B) other than (A) having a molecular weight not higher than 280 in an amount of from 1.9 to 6.0 equivalents per equivalent of the polyol mixture (A), and a substantially bivalent alicyclic or aliphatic polyisocyanate compound (C) in an amount of from 0.8 to 1.2 equivalents per equivalent of the sum of the polyol mixture (A) and the chain extender (B), as its main components, and a layer of inorganic glass.

10. The laminated product according to claim 9, wherein the reaction curable composition further contains a silane compound (D) in an amount of from 0.001 to 10 wt %, based on the total weight of components (A), (B) and (C).

11. The laminated product according to claim 9, wherein the inorganic glass is inorganic glass having its surface treated with a silane compound (E).

12. A laminated product having a layered structure comprising at least three layers including a first surface layer made of a synthetic resin, an interlayer made of a transparent and cross-linked polyurethane resin sheet having self-healing properties and evincing excellent penetration resistance, prepared from a reaction-curable composition which comprises a polyol mixture (A) comprising a polyester polyol and/or a polycarbonate polyol, as its main components, and containing a diol and a trivalent or higher valent polyol, the average hydroxyl value of the mixture being from 40 to 120, the upper limit of the hydroxyl value of each polyol being 400 and the equivalent ratio of the trivalent or higher valent polyol to the diol being from 0.1 to 0.8, a substantially bivalent chain extender (B) other than (A) having a molecular weight not higher than 280 in an amount of from 1.9 to 6.0 equivalents per equivalent of the polyol mixture (A), and a substantially bivalent alicyclic or aliphatic polyisocyanate compound (C) in an amount of from 0.8 to 1.2 equivalents per equivalent of the sum of the polyol mixture (A) and the chain extender (B), as its main components, and a second surface layer made of inorganic glass.

13. The laminated product according to claim 12, wherein the reaction-curable composition further contains a silane compound (D) in an amount of from 0.001 to 10 wt %, based on the total weight of components (A), (B) and (C).

14. The laminated product according to claim 12, wherein the inorganic glass is inorganic glass having its surface treated with a silane compound (E).

* * * * *